United States Patent
Takakura

(10) Patent No.: US 7,810,748 B2
(45) Date of Patent: Oct. 12, 2010

(54) SCRAPPING MACHINE

(75) Inventor: Yoshiaki Takakura, Toyama (JP)

(73) Assignee: Kabushiki Kaisha Towani, Toyama-Shi (JP)

( * ) Notice: Subject to any disclaimer, the term of this patent is extended or adjusted under 35 U.S.C. 154(b) by 779 days.

(21) Appl. No.: 11/628,407

(22) PCT Filed: Jun. 1, 2005

(86) PCT No.: PCT/JP2005/010056

§ 371 (c)(1),
(2), (4) Date: Feb. 2, 2007

(87) PCT Pub. No.: WO2005/118169

PCT Pub. Date: Dec. 15, 2005

(65) Prior Publication Data

US 2008/0087154 A1    Apr. 17, 2008

(30) Foreign Application Priority Data

Jun. 1, 2004    (JP)    ............................. 2004-163686

(51) Int. Cl.
*B02B 5/02* (2006.01)
(52) U.S. Cl. .................. 241/101.73; 241/266
(58) Field of Classification Search ............ 241/101.73, 241/166, 198.1, 266
See application file for complete search history.

(56) References Cited

U.S. PATENT DOCUMENTS 5,472,019 A * 12/1995 Shimono ................. 139/384 B
5,478,019 A * 12/1995 Morikawa et al. ...... 241/101.73
5,992,023 A * 11/1999 Sederberg et al. ............. 30/134

FOREIGN PATENT DOCUMENTS

JP    2-186019 A    7/1990
JP    3-78460 B2    12/1991

(Continued)

OTHER PUBLICATIONS

Notification Concerning Transmittal of International Preliminary Report on Patentability, Chapter I of the Patent Cooperation Treaty, and Written Opinion of the International Searching Authority, dated Dec. 28, 2006, for PCT/JP2005/010056, 6 sheets.

*Primary Examiner*—Dana Ross
*Assistant Examiner*—Matthew G Katcoff
(74) *Attorney, Agent, or Firm*—Holtz, Holtz, Goodman & Chick, PC

(57) ABSTRACT

The present invention provides a multi-purpose scrapping machine suitable for the scrapping work for not only discarded automobiles but also various kinds of wastes such as construction wastes and piping wastes. The scrapping machine is equipped with a hydraulic-actuated arm/boom assembly mounted on an automotive vehicle, a nibbling pincher for scrapping work mounted to the tip of the arm/boom assembly, and a pair of right and left power-driven clamp arms mounted at the front or rear of the vehicle. The scrapping machine comprises a peeling tool to clamp a covered electric wire to be scrapped from the periphery thereof by the closing motion of the clamp arms and to slash and peel off the outer sheath of the wire in the state of clamping the wire in accordance with the drawing operation of the core of the wire with the nibbling pincher.

24 Claims, 6 Drawing Sheets

FOREIGN PATENT DOCUMENTS

| | | |
|---|---|---|
| JP | 7-24624 A | 1/1995 |
| JP | 3101717 B2 | 8/2000 |
| JP | 2001-25672 A | 1/2001 |
| JP | 2001-136618 A | 5/2001 |
| JP | 2001-150222 A | 6/2001 |
| JP | 2002-157931 A | 5/2002 |
| JP | 2003-275610 A | 9/2003 |
| JP | 2004-197419 A | 7/2004 |

* cited by examiner

SCRAPPING MACHINE

This application is a U.S. National Phase Application under 35 USC 371 of International Application PCT/JP2005/010056 filed Jun. 1, 2005.

TECHNICAL FIELD

The present invention relates to a multi-purpose scrapping machine suitable for scrapping work of various kinds of waste materials such as discarded automobiles, construction wastes, and piping wastes. In particular, the present invention relates to a scrapping machine equipped with a hydraulic-actuated arm and boom assembly which is mounted on an automotive vehicle so as to be vertically tilted and horizontally swiveled, a power-driven nibbling pincher for scrapping work attached to the tip of the arm and boom assembly so as to be operated through remote control, and a pair of right and left power-driven clamp arms mounted at the front or rear of the vehicle so as to be vertically tilted and horizontally pivoted.

BACKGROUND ART

In conventional scrapping work of discarded automobiles, stacked scrapped cars have been lifted down one by one on the ground with a crane, transversely conveyed with a carrier; and cut into appropriate sizes with a cutting torch or the like, or subjected to the disassembling of the engine parts at a workplace in a scrap plant.

Meanwhile, as disclosed hereinafter referenced patent document D1 for example, it is known for the scrapping work to use a scrapping machine equipped with a hydraulic-actuated arm and boom assembly which is mounted on an automotive vehicle so as to be vertically tilted and horizontally swiveled, a power-driven nibbling pincher for scrapping work attached to the tip of the arm and boom assembly so as to be operated through remote control, and a pair of right and left power-driven clamp arms mounted at the front or rear of the vehicle so as to be vertically tilted and horizontally pivoted. The clamp arms are equipped with various kinds of work hands, such as a pair of opposing cups to rotatably pinch and hold both ends of an object to be scrapped and a pair of breaking tools to forcibly press and thus crush or break the object to be scrapped. It is generally true that, with such a scrapping machine, the scrapping work efficiency has drastically improved and moreover fractional recovery by separating each raw material from scrap has been realized with great efficiency.

Recent situation is such that ordinary scrapping work is insufficient to process not only discarded automobiles but also various other scrapping objects such as home electric appliances including refrigerators and washing machines, construction wastes including rebar and window sashes, and piping wastes including drainage pipes or water supply pipes, and various scrapping objects tend to increasingly pile up at many places waiting for being disassembled. In the case of a discarded electric washing machine for example, it is necessary to separate and fractionalize the outer casing and the washing tub from the motor in the interior at disassembling work and, in the case of an electric refrigerator too, it is necessary to disassemble the casing from the inner insulator and the compressor. However, with a conventional scrapping machine, it is impossible to directly take out such a motor/compressor from the interior of the scrapping objects with a nibbling pincher attached to the tip of a hydraulic-actuated arm/boom assembly. Hence, disassembling has been processed by additional handwork or a still integrated unit has unwillingly been disposed of without separation.

Under such circumstances, as disclosed in the after-referenced patent document D2 for example, known also is a multi-purpose scrapping machine capable of disassembling and fractionalizing various kinds of scrapping objects represented by scrapped cars with great efficiency by expanding the fractional recovery range in the size and strength of a scrapping object.

Further, piping wastes such as discarded water supply or drainage pipes are generally in the state of connecting valves on the pipes and this means that dissimilar metal members to be fractionalized and separately recovered are relatively small in size and stick firmly. Such wastes have been hardly handled with a conventional scrapping machine and hence they have been disposed of without being separated or recovered in many cases. In such a case, the pipe parts should be recovered as ferric scrap useful mainly as steelmaking materials and the valve parts should be fractionalized and recovered as recycling materials of relatively expensive gunmetal. However, the screw part of a steel pipe is in the state of being firmly screwed into the socket part of a gunmetal valve for example and thus it is estimated that the economic effect of material recycling further improves if such a unit can be disassembled and recovered separately.

Patent document D1: JP 3-78460 B1

Patent document D2: JP3101717 B2

DISCLOSURE OF THE INVENTION

Problems to be Solved by the Invention

In recent years, there has been a growing trend in the recycling use of resources and, with regard to not only discarded automobiles but also construction wastes and piping wastes, it has been desired not to dump the waste materials for land-filling but to separately recover reusable raw materials with as high degrees of quality and purity as possible. For example, in the case of destruction of a ferroconcrete building, electric wires extending throughout inner sections can be reused as copper resources, window sashes and partition panel frames as aluminum resources, and handrails and fire doors as iron resources. Further, rebar in a building framework is also reusable as iron resources and even concrete pieces are reusable as road pavement materials.

For example, pipes used as indoor water-supply piping are iron or steel pipes about 30 to 100 mm in diameter and most of them are connected to valves such as water stop valves. Further, some covered electric wires used for interior electric wirings have cross-sectional areas of about 400 $mm^2$ and the core wires are made of high quality copper. When such piping wastes and discarded electric wires are recycled, they are too small in size to be handled and are hardly cut out with a nibbling pincher mounted on a conventional scrapping machine and handwork has been inevitably required as additional processing in the event of peeling off an outer sheath (mostly made of plastic material) from a covered electric wire in order to separately recover high quality copper material.

Thus, an object of the present invention is to solve the aforementioned conventional problems and provide a multi-purpose scrapping machine that is suitable for scrapping work of various waste materials including not only discarded automobiles but also construction wastes, piping wastes, and others.

Means for Solving the Problems

According to the present invention, that object is attained by a scrapping machine that is equipped with a hydraulic-actuated arm and boom assembly which is mounted on an automotive vehicle so as to be vertically tilted and horizontally swiveled, a power-driven nibbling pincher for scrapping work mounted to the tip of the arm and boom assembly so as to be operated through remote control, and a pair of right and left power-driven clamp arms supported by a support block with respective pivot support pins for the horizontal swing motion of the clamp arms, the support block being mounted at the front or rear of the vehicle so as to be vertically tilted. In particular, the scrapping machine comprises a peeling tool to clamp a covered electric wire to be scrapped from the periphery thereof by the closing motion of the clamp arms and to slash and peel off the outer sheath of the covered electric wire in the state of clamping the covered electric wire in accordance with the drawing operation of the core wire of the covered electric wire with the nibbling pincher mounted on the tip of the hydraulic-actuated arm and boom assembly, the peeling tool being formed with two halves opposing each other and supported by the clamp arms respectively so that the two halves meet each other and separate from each other through the opening and closing motion of the clamp arms, and at least one of the two halves being provided with at least one protruding bite blade penetrating at least partially into the outer sheath of the covered electric wire clamped in between when the two halves meet each other.

A scrapping machine according to the present invention is a so-called multi-purpose scrapping machine that is suitable for not only scrapping work of discarded automobiles but also work to separately recover copper resources from wasted covered electric wires in particular and moreover scrapping work for fractional recover of construction wastes and piping wastes. That is, the scrapping machine makes it possible to separately scrap discarded electric wires and piping wastes generated together with construction wastes with great work efficiency. In particular, a scrapping machine according to the present invention has a peeling tool and makes it possible to easily peel off an outer sheath from a covered electric wire with great work efficiency without the intervention of handwork.

When an outer sheath is peeled off from a covered electric wire with a peeling tool, an end of the covered electric wire cut into an appropriate length is grasped with a pincher mounted on the tip of a hydraulic-actuated arm and boom assembly, the hydraulic-actuated arm and boom assembly and the pincher are moved through hydraulic powered operation, thereby the covered electric wire grasped with the pincher is placed in the state of drooping between the aforementioned two halves supported respectively by a pair of clamp arms of an opening state. Successively, the halves of the peeling tool are made to meet each other by driving the clamp arms to the closed state and the covered electric wire is brought to the state of being clamped between the two halves. Thereafter, the core wire of the covered electric wire protruding from an end of the peeling tool is grasped with the pincher and drawn by hydraulically operating the hydraulic-actuated arm/boom assembly and the pincher, resultantly the core wire is separately recovered while the outer sheath of the covered electric wire is slashed with a protruding bite blade, the slashed outer sheath is discharged outside the peeling tool in the state of being warped by the elasticity or plasticity of its own, and thus the peeling operation is completed.

According to a preferred embodiment of the present invention, the two halves of the peeling tool form a conical or pyramid funnel-shaped passage having a relatively large opening at one end thereof and a relatively small opening at the other end thereof when the two halves meet each other, and at least one of the two halves is provided with the protruding bite blade on the inner wall near the relatively small opening of the funnel-shaped passage. In this case, it is preferable from the viewpoint of operability that each of the two halves is supported by each of the clamp arms respectively so that the relatively large opening of the funnel-shaped passage faces downward. Further, it is desirable that each of the two halves is supported by each of the clamp arms respectively so that the axis of the funnel-shaped passage is inclined toward the front or rear of the vehicle. Consequently, the outer sheath can be smoothly slashed with the protruding bite blade along with the drawing of the core wire. Meanwhile, it is ideal if the core wire is drawn in a certain linear direction with the hydraulic-actuated arm and boom assembly and the pincher, but the core wire is substantially drawn through synthetic motion including the motion of the hydraulic-actuated arm and boom assembly and the pincher and hence the direction of the synthetic motion generally follows a curve of a certain curvature deviated from a linear direction. As a result, it sometimes happens that a biased stress appears at the two halves of the peeling tool during the drawing of the core wire. In order to avoid the biased stress, it is preferable that each of the two halves of the peeling tool is supported by a horizontal pivot shaft mounted on each of the clamp arms so as to be swung around the horizontal pivot shaft in a certain limited angle range. In this case, it is desirable to devise so that the two halves are maintained at an identical angle when they are separated from each other. For example, it is preferable that each of the two halves has a gravity center below the center axis of the horizontal pivot shaft so as to stop by the action of the gravity at a position of a critical end in the rotation angle range in an unforced state According to another preferred embodiment of the present invention, each of the two halves comprises a plurality of protruding bite blades which are arranged so that each of the protruding bite blades of the one of the halves faces and meshes with an associated protruding bite blades of the other of the halves when the two halves meet each other. By arranging the protruding bite blades as stated above, the peeling work can be smoothly done as long as the covered electric wire clamped with the peeling tool touches at least one of the protruding bite blades and the advantage is that the motion and positioning by the hydraulic operation of the hydraulic-actuated arm and boom assembly and the pincher are facilitated.

According to still another preferred embodiment of the present invention, at least one of the two halves comprises a guide piece for aligning the two halves when the two halves meet each other. The guide piece may be formed so as to cover the outer circumference of the divided plane between the two halves and, particularly in this case, by forming the guide piece so that the span width of the guide piece may increase at a position close to the relatively large opening and may gradually reduce toward the relatively small opening, it is possible to surely introduce the covered electric wire grasped with the pincher in a drooping state into the interior of the funnel-shaped passage when the clamp arms are closed and the two halves of the peeling tool approach each other.

A scrapping machine according to still another preferred embodiment of the present invention comprises a shear cutter for cutting an object to be scrapped, the cutter being mounted on the pair of clamp arms at a position near to the pivotal support pins of the clamp arms. The shear cutter includes a pair of shear blades, a pivot element for pivotably interconnecting the shear blades at their respective one ends on the side toward the support block, and a pair of links for pivotably connecting the other end of each of the shear blades to each of the clamp arms.

The shear cutter is not only used in the scrapping work of discarded automobiles but also effectively used particularly in the scrapping work for fractional recover of construction wastes and piping wastes. Examples of main wastes to be cut are lengthy wastes of indefinite shapes such as rebar, window sashes, and indoor water-supply pipes in building destruction wastes.

In the cutting work with the shear cutter, a lengthy waste to be cut is grasped with the pincher while a pair of clamp arms are in the state of open, and the lengthy waste grasped with the pincher is placed between the pair of shear blades in the state of open by moving the lengthy waste with the hydraulic-actuated arm and boom assembly and the pincher through hydraulic operation. Successively, the shear blades are closed with the hydraulic actuation of the clamp arms to the closed position and thereby the lengthy waste in between is cut.

According to a preferred embodiment of the present invention, each of the shear blades comprises a single edged blade having a sharpened face on a side opposite to each of the sliding faces of the shear blades. Consequently, chips are hardly caused during cutting and loss of recovered resources can be avoided.

According to still another preferred embodiment of the present invention, each of the shear blades has a concave blade shape in a plane parallel with the sliding faces of the shear blades so that the tips of the single edged blades remote from the pivot element lap over with each other in advance of the concavity thereof in accordance with the closing motion of the pair of clamp arms. Consequently, the lengthy waste is surely taken in between the pair of shear blades during cutting and the cutting operation can be completed without fail.

According to still another preferred embodiment of the present invention, a scrapping machine comprises a peeling tool mounted on the clamp arms to clamp a covered electric wire to be scrapped from the periphery thereof by the closing motion of the clamp arms and to slash and peel off the outer sheath of the covered electric wire in the state of clamping the covered electric wire in accordance with the drawing operation of the core wire of the covered electric wire with the nibbling pincher mounted on the tip of the hydraulic-actuated arm and boom assembly, and a shear cutter for cutting an object to be scrapped, the cutter being mounted on the pair of clamp arms at a position nearer to the pivotal support pins of the clamp arms than the position at which the peeling tool is mounted on the clamp arms. The peeling tool is formed with two halves opposing to each other and supported by the clamp arms respectively so that the two halves meet each other and separate from each other through the opening and closing motion of the clamp arms, and at least one of the two halves is provided with at least one protruding bite blade penetrating at least partially into the outer sheath of the covered electric wire clamped in between when the two halves meet each other. The shear cutter includes a pair of shear blades, a pivot element for pivotably interconnecting the shear blades at their respective one ends on the side toward the support block, and a pair of links for pivotably connecting the other end of each of the shear blades to each of the clamp arms.

According to still another preferred embodiment of the present invention, a scrapping machine further comprises a pair of opposing cups for clamping and holding an object to be scrapped from both the sides, and each of the cups is supported by each of the clamp arms respectively at a position remoter than that of the peeling tool and/or the shear cutter from the pivot support pins of the clamp arms.

According to still another preferred embodiment of the present invention, a scrapping machine further comprises a pair of breaking tools for forcibly pressing and thus crushing or breaking an object to be scrapped from both the sides, and each of the breaking tools is supported by each of the clamp arms respectively in place of the peeling tool, or supported by each of the clamp arms respectively at a position nearer than that of the peeling tool to the pivot support pins of the clamp arms or at a position remoter than that of the shear cutter from the pivot support pins of the clamp arms.

A scrapping machine according to a particularly preferred embodiment of the present invention is equipped with the opposing cups, the peeling tool or the breaking tools, and the shear cutter in the order from a position remote from the pivot support pins of the clamp arms to a position near to the pivot support pins of the clamp arms.

The aforementioned features and advantages of the present invention will be further clearly understood from the following explanations made in reference to the attached drawings showing embodiments merely for exemplification that are not intended to limit the technical scope of the present invention.

BRIEF DESCRIPTIONS OF THE DRAWINGS

Figure 4A:
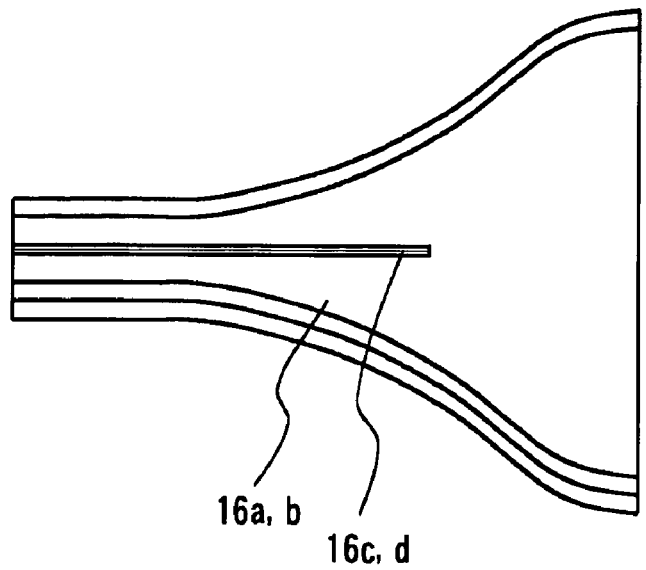
Figure 4B:
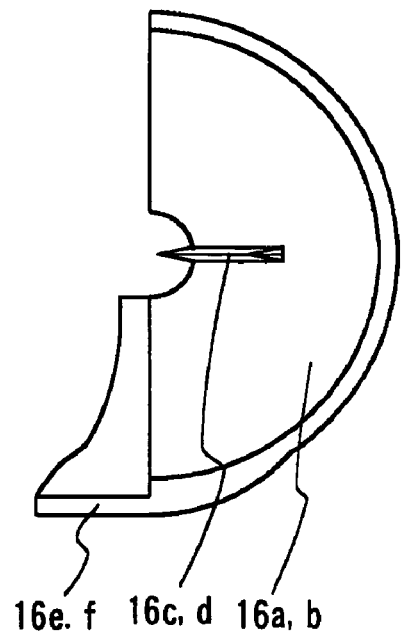

FIGS. 4*a* and 4*b* show a side view and plan view showing one of the two halves of a peeling tool.

Figure 5:
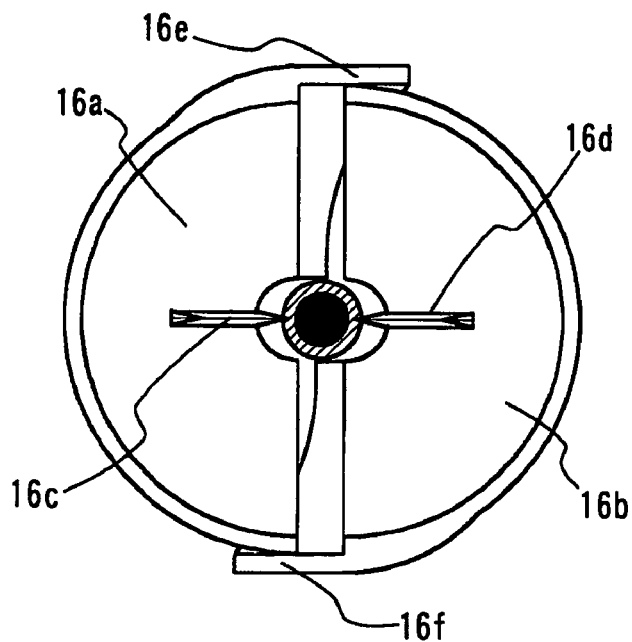

FIG. 5 is an explanatory view showing the state where the two halves of the peeling tool meet each other.

Figure 6:
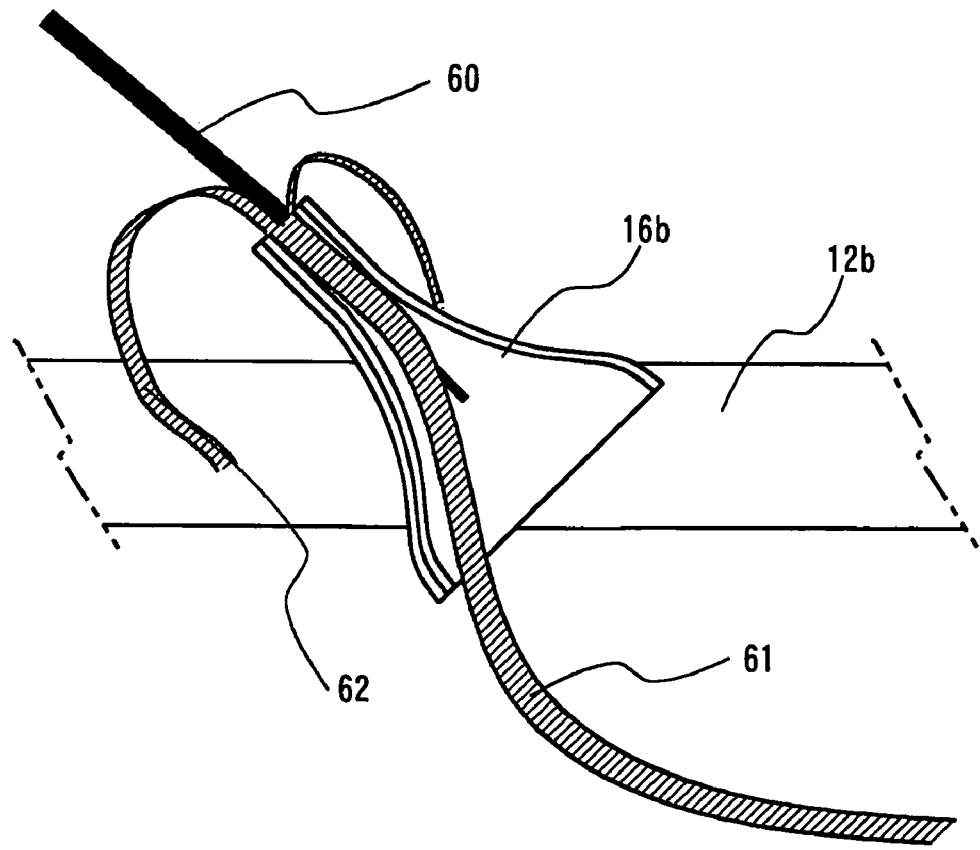

FIG. 6 is an explanatory view showing work to peel off an outer sheath with a peeling tool.

Figure 7:
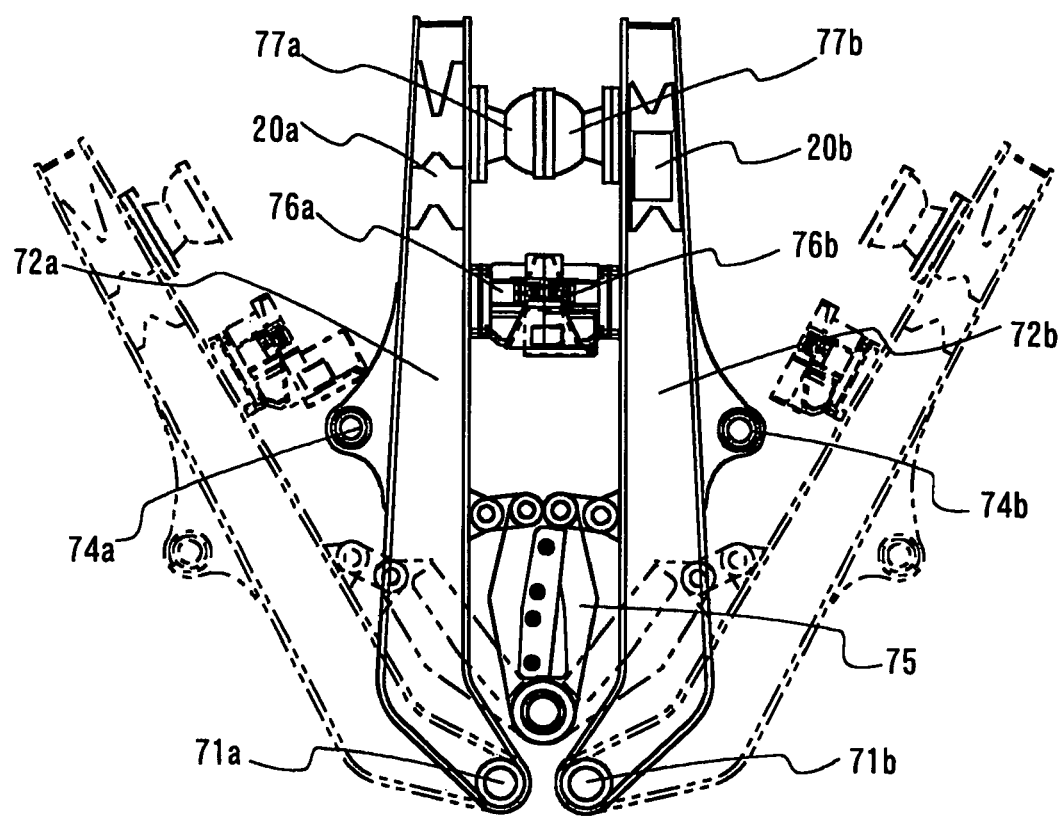

FIG. 7 is a plan view showing a configuration of the members of clamp arms according to another embodiment of the present invention.

Figure 8:
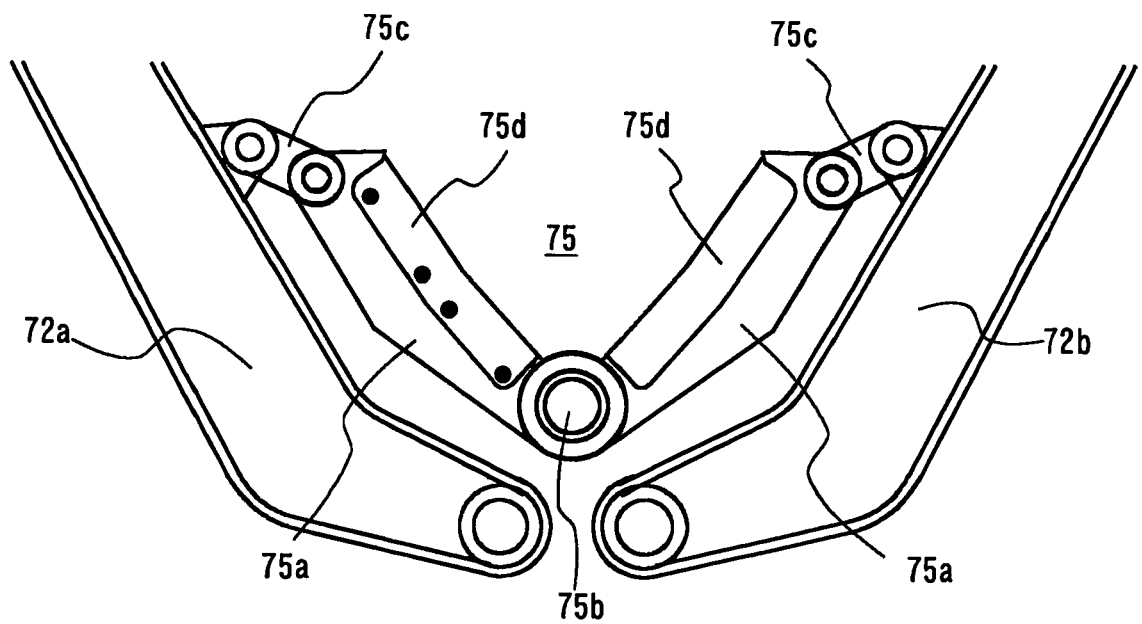

FIG. 8 is a plan view showing a configuration of a shear cutter.

Figure 9A:
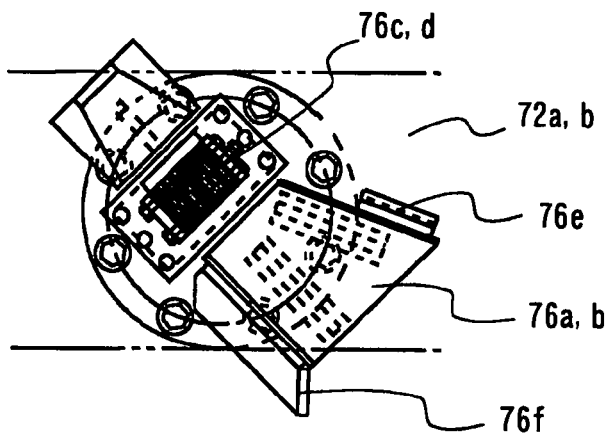
Figure 9B:
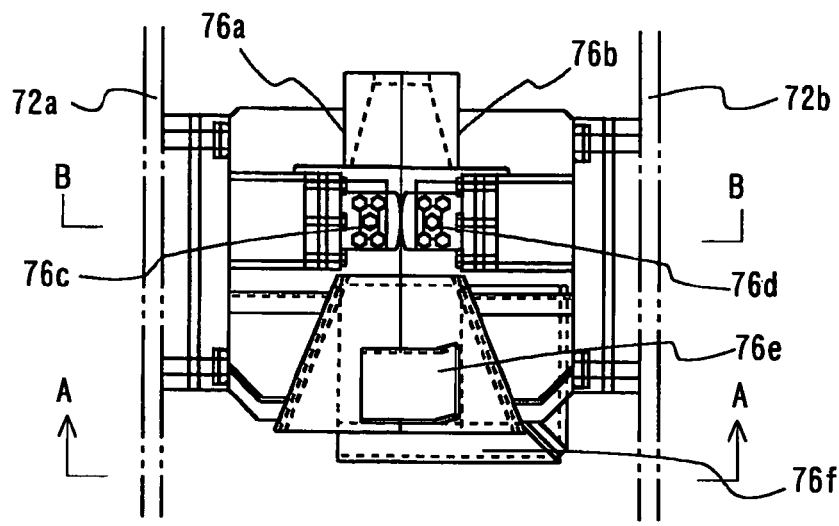
Figures 9C, 9D:
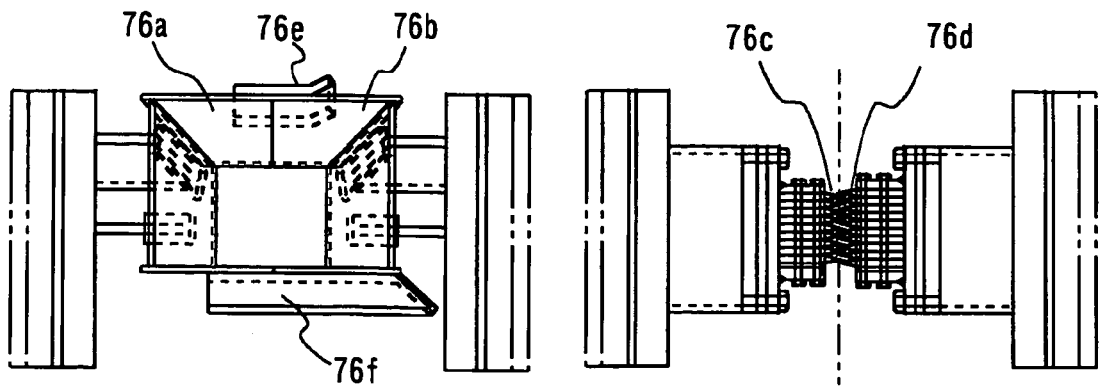

FIGS. 9*a* to 9*d* show explanatory views representing a configuration of a peeling tool according to still another embodiment of the present invention, in which FIG. 9*a* is a side view, FIG. 9*b* a plan view, FIG. 9*c* a view taken on line A-A of FIG. 9*b*, and FIG. 9*d* a view taken on line B-B of FIG. 9*b*.

BEST MODE FOR CARRYING OUT THE INVENTION

Figure 1:
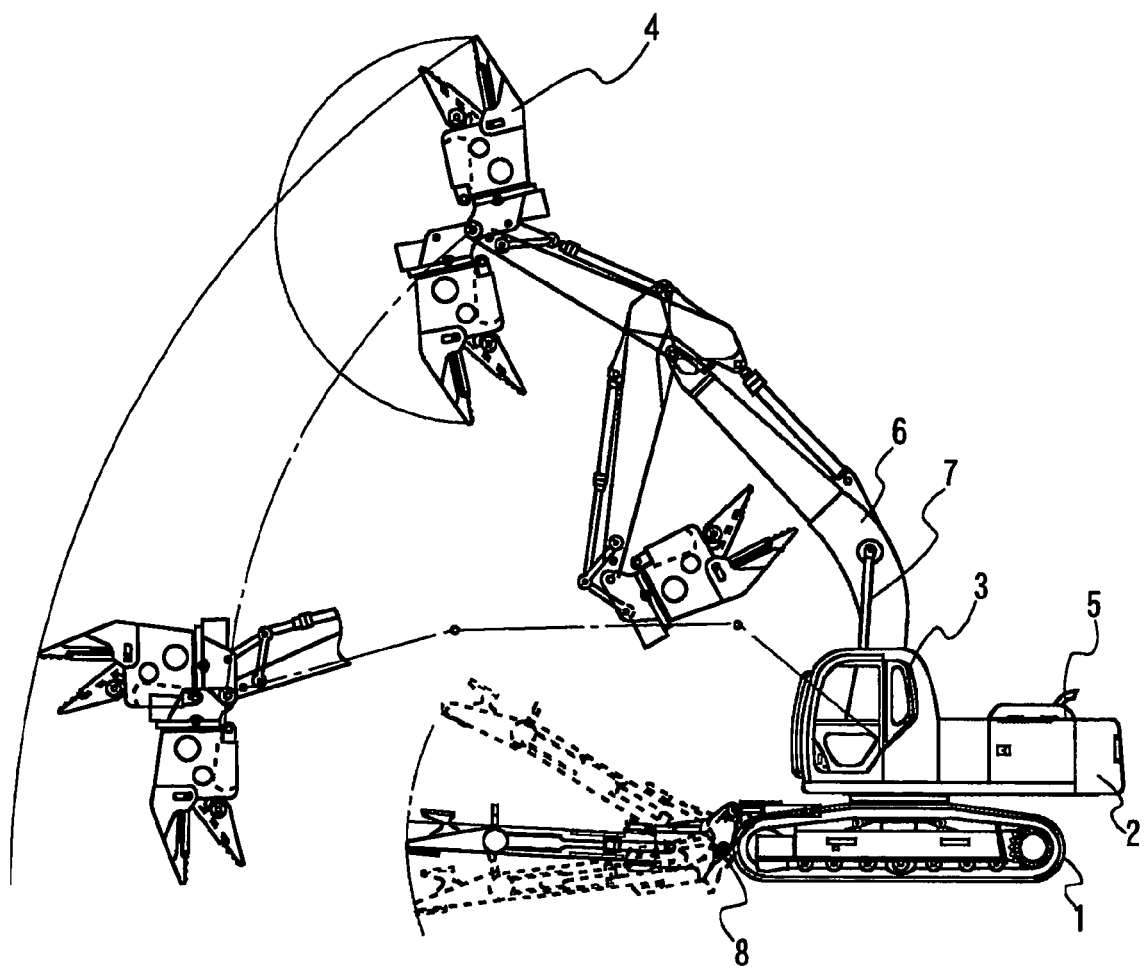
FIG. 1 is a side view illustratively showing a scrapping machine according to an embodiment of the present invention.
Figure 2:
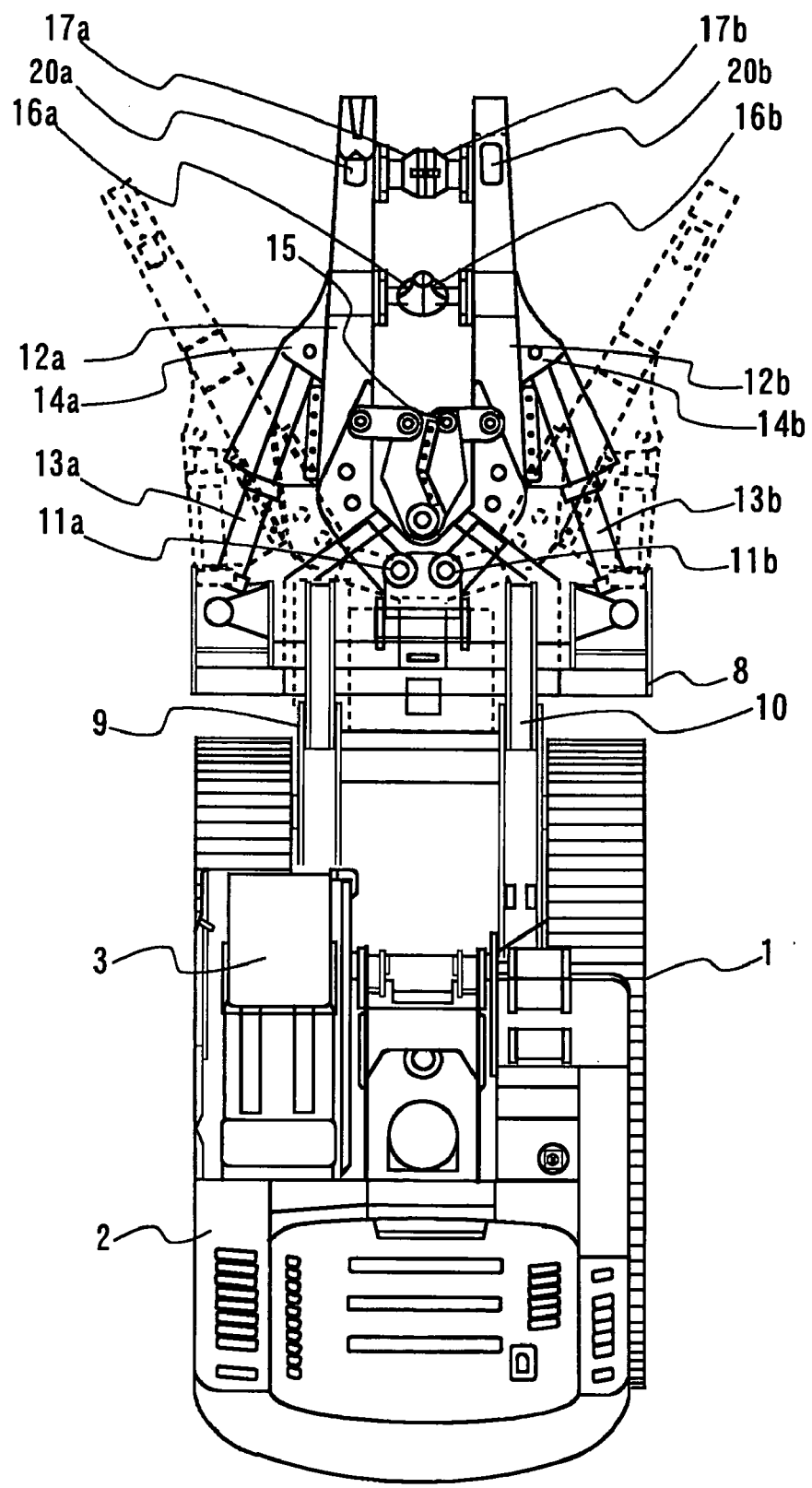
FIG. 2 is a plan view of the scrapping machine shown in FIG. 1.

As shown in FIGS. 1 and 2, an automotive vehicle 1 is a crawler tractor equipped with a pivot cab 2 driven by engine power or an electric power supplied from a generator mounted thereon or an external power source. The pivot cab 2 includes a hydraulic power unit 5 installed in a diesel motor compartment on the rear part of the cab. On the pivot cab 2, an operator cabin 3 is placed on the left front side thereof so that the cabin 3 faces the front during traveling and a hydraulic-actuated arm and boom assembly 6 is pivotably supported in the center region thereof so as to be vertically tilted with a tilt cylinder 7. The arm and boom assembly 6 has a nibbling pincher 4 for scrapping work at the arm tip thereof. The arm and boom assembly 6 folds when the vehicle 1 is conveyed with a tractor trailer or the like.

A support block 8 is mounted to the front part of the vehicle 1 with a horizontal pivot shaft 9 so as to be vertically tilted and the tilting motion of the support block 8 is driven by a pair of hydraulic piston cylinder units 10 disposed so as to protrude forward from the frame of the vehicle 1. A pair of right and left clamp arms 12a and 12b are disposed in front of the support block 8 in the manner of protruding forward so as to be supported openably and closably by vertical pivot support pins 11a and 11b disposed close to each other. Then the piston rod tips of hydraulic piston cylinder units 13a and 13b for driving the opening and closing motion of both the clamp arms relative to the support block 8 are respectively connected to the middle portion of the clamp arms by hinged pins 14a and 14b, and the positions of the hinged pins are the action points of levers in the opening and closing motion.

To the inner side surfaces, opposed to each other, of both the clamp arms 12a and 12b, in the order from the positions close to the pivot support pins 11a and 11b, a shear cutter 15 for cutting an object to be scrapped through the closing motion of the clamp arms 12a and 12b, a peeling tool 16 (shown as a pair of halves 16a and 16b in the figure) for slashing and peeling off the outer sheath of a covered electric wire when the two halves meet each other by the closing motion of the clamp arms 12a and 12b, and opposing cups 17a and 17b to clamp and hold the object to be scrapped from both the sides are replaceably fixed respectively.

The shear cutter 15 includes a pair of shear blades 15a, a pivot pin 15b for pivotably interconnecting the shear blades at their respective one ends on the side toward the pivot support pins 11a and 11b on the support block 8, and a pair of link levers 15c for pivotably connecting the other end of each of the shear blades to each of the clamp arms respectively. The shear blades open and close while pivoting on the pin 15b and slidingly lapping over each other in proportion as the clamp arms open and close and thereby cut a lengthy waste clamped in between.

Figure 3:
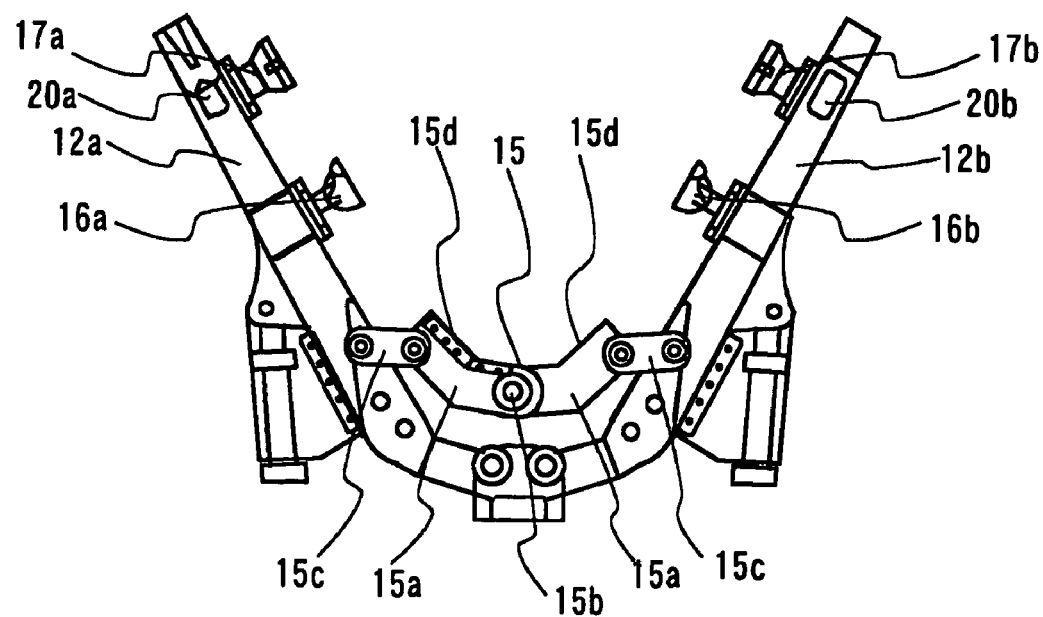
FIG. 3 is a plan view showing a configuration of the members of a pair of clamp arms.

A replacement blade 15d detachably mounted to each of the shear blades 15a is a cutting edge composed of a single edged blade having a sharpened face on a side opposite to each of the lapping faces and the edge line of the replacement blade is formed into a concave shape as shown in FIG. 3. That is, each of the shear blades has a concave blade shape in a plane parallel with the sliding faces of the shear blades so that the tips of the single edged blades remote from the pivot pin 15b are lap over with each other in advance of the concavity at the middle portion of each of the blades in accordance with the closing motion of the pair of clamp arms.

A pair of horn-shaped tools 20a and 20b are fixed on the opposing cups 17a and 17b. The horn-shaped tools 20a and 20b are bent in the middle portion thereof so as to be skewed away from each other as the height increases. With the use of the horn-shaped tools 20a and 20b, it is possible to cleave and disassemble an object to be scrapped through the opening motion of the pair of clamp arms.

Further, it is possible to stretch a circular object to be scrapped such as a worn tire in the radial direction by hitching the horn-shaped tools 20a and 20b fixed on the opposing cups 17a and 17b to an inner hole of the object and opening the clamp arms 12a and 12b. It is also possible to cut the object to be scrapped efficiently by breaking the stretched middle portion with the nibbling pincher 4 for scrapping work attached to the arm tip of the arm and boom assembly 6.

The halves 16a and 16b of the peeling tool shown in FIGS. 4 and 5 are detachably mounted to opposing positions of the clamp arms 12a and 12b respectively and, when the clamp arms 12a and 12b are in a closing state, the halves 16a and 16b meet each other and form a funnel-shaped passage in the interior thereof so that the large opening thereof faces obliquely downward and the small opening thereof faces obliquely upward.

A pair of protruding bite blades 16c and 16d opposed to each other are fixed to positions closer to the small opening on the inner wall of the funnel-shaped passage formed by the two halves 16a and 16b.

Further, guide pieces 16e and 16f are attached to the halves 16a and 16b so as to cover the outer periphery of the divided planes and the width between the guide pieces 16e and 16f increases at a position close to the large opening and gradually reduces toward the small opening.

When peeling work is carried out with the peeling tool 16, as shown in FIG. 6, a covered electric wire 61 cut into a desired length with the shear cutter 15 is grasped with the pincher 4 and the covered electric wire 61 is placed in a drooping state between the halves 16a and 16b mounted on the clamp arms 12a and 12b respectively. When the covered electric wire 61 is clamped between the halves 16a and 16b by gradually closing the clamp arms 12a and 12b and approximating the halves 16a and 16b to each other, the protruding bite blades 16c and 16d of the halves 16a and 16b penetrate into the outer sheath 62 of the covered electric wire 61. By pulling upward the covered electric wire 61 grasped with the pincher 4 shown in FIG. 1 in this state, the sheath 62 is slashed and peeled off with the protruding bite blades and the copper core 60 of the wire 61 is separately recovered.

The guide pieces 16e and 16f also play the role of taking a covered electric wire held between the two halves in a drooping state into the interior of the two halves without fail when the halves 16a and 16b are brought close to each other and meet each other.

Further, the halves 16a and 16b are obliquely attached to the clamp arms 12a and 12b and hence a sheath can be smoothly slashed. In addition, the halves may be pivoted in a predetermined angle range so as to follow the motion of the pincher.

A scrapping machine having the aforementioned three types of tools attached to the clamp arms can be suitably used particularly not only in scrapping work of discarded automobiles but also in separable scrapping work of construction wastes and piping wastes.

Further, the three types of tools are replaceably mounted to the clamp arms and various attachment means can be taken including welding, riveting, and bolting and moreover each of the tools may be replaced with another type of tool.

FIG. 7 shows a plan view of another configuration of the clamp arms in the closing state. FIG. 8 is a plan view showing the configuration of the shear cutter of the clamp arms shown in FIG. 7. FIGS. 9a to 9d show explanatory views representing a configuration of a peeling tool of the clamp arms shown in FIG. 7, in which FIG. 9a is a side view, FIG. 9b a plan view, FIG. 9c a view taken on line A-A of FIG. 9b, and FIG. 9d a view taken on line B-B of FIG. 9b.

FIG. 7 shows a modified embodiment of the pair of clamp arms mounted on the support block 8 shown in FIG. 2. In the present embodiment, the clamp arms 72a and 72b are supported by pivot support pins 71a and 71b disposed close to each other. Each of the clamp arms has a hinged pin 74a or 74b at the middle portion thereof, and the piston rod of the hydraulic piston cylinder unit 73a or 73b is connected so that the opening and closing motion of both the clamp arms is effected by hydraulic actuation of the hydraulic piston cylinder units 73a and 73b similar to those shown in FIG. 2. The positions of the hinged pins are the action points of levers in the opening and closing motion.

To the inner side surfaces, opposed to each other, of both the clamp arms 72a and 72b, in the order from the positions close to the pivot support pins 71a and 71b, there are detachably mounted a shear cutter 75 for clamping and cutting an object to be scrapped into two pieces through the closing motion of the clamp arms 72a and 72b, a peeling tool (shown as a pair of halves 76a and 76b in the figure) for slashing and peeling off the outer sheath of a covered electric wire to be scrapped when the halves meet each other by the closing motion of the clamp arms 72a and 72b, and opposing cups 77a and 77b for clamping and holding the object to be scrapped between the clamp arms.

The shear cutter 75 shown in an enlarged manner in FIG. 8 has a pair of shear blades 75a, a pivot pin 75b for pivotally interconnecting the shear blades at their respective one ends on the side toward the pivot support pins 71a and 71b on the support block (not shown), and a pair of link levers 75c for pivotably connecting the other end of each of the shear blades to each of the clamp arms respectively. The shear blades open and close while pivoting on the pin 75b and slidingly lapping over each other in proportion to the opening and closing motion of the clamp arms and thereby cut a lengthy waste clamped in between.

Here, each of the replacement blades 75d detachably mounted on the shear blades 75a is also a single edged blade having a sharpened face on one side opposite to the lapping faces in the same way as the cases shown in FIGS. 2 and 3 and the edge line is also formed into a concave shape.

The halves 76a and 76b shown in FIGS. 7 and 9 are attached in an opposed manner to opposing positions of the clamp arms 72a and 72b respectively and, when the clamp arms 72a and 72b are in a closing state, the halves 76a and 76b unite and meet each other and form a square-pyramid-shaped passage so that the large opening thereof faces obliquely downward and the small opening thereof faces obliquely upward.

A pair of protruding bite blades 76c and 76d opposed to each other are fixed to positions closer to the small opening on the inner wall of the halves 76a and 76b. The protruding bite blades 76c and 76d opposed to each other mesh with each other when they meet each other as shown in FIG. 9d.

Guide pieces 76e and 76f are attached to the halves 76a and 76b so as to cover the outer periphery of the divided planes of the halves and the guide pieces are formed so that the width between the guide pieces may increase on the side of the large opening and gradually reduce toward the small opening of the square-pyramid-shaped passage.

A pair of horn-shaped tools (20a, 20b) are fixed on the opposing cups 77a and 77b in the same way as shown in FIG. 2. The horn-shaped tools are bent in the middle portion thereof so as to be skewed away from each other as the height increases. With the use of the horn-shaped tools, it is possible to cleave and disassemble an object to be scrapped through the opening motion of the pair of clamp arms.

Further, it is possible to stretch a circular object to be scrapped such as a worn tire in the radial direction by hitching the horn-shaped tools fixed on the opposing cups 77a and 77b to an inner hole of the object and opening the clamp arms 72a and 72b. It is also possible to cut the object to be scrapped efficiently by breaking the stretched middle portion with the nibbling pincher 4 for scrapping work attached to the tip of the boom.

I claim:

1. A scrapping machine equipped with a hydraulic-actuated arm and boom assembly which is mounted on an automotive vehicle so as to be vertically tiltable and horizontally swivelable, a power-driven nibbling pincher for scrapping work mounted to a tip of the arm and boom assembly so as to be operable through a remote control, a support-block mounted at a front or rear of the vehicle so as to be vertically tiltable, and a pair of right and left power-driven clamp arms supported by the support block respectively with a pair of pivot support pins for a horizontal swing motion, wherein the scrapping machine comprises:

a peeling tool adapted to clamp a covered electric wire to be scrapped from a periphery thereof by a closing motion of the clamp arms and to slash and peel off an outer sheath of the clamped covered electric wire in accordance with a drawing operation of a core wire of the clamped covered electric wire with the nibbling pincher mounted on the tip of the hydraulic-actuated arm and boom assembly, wherein the peeling tool is formed with two halves opposing each other and supported by the clamp arms respectively so that the two halves meet each other and separate from each other through an opening and closing motion of the clamp arms, and wherein at least one of the two halves is provided with at least one protruding bite blade adapted to penetrate at least partially into the outer sheath of the covered electric wire clamped in between when the two halves meet each other.

2. The scrapping machine according to claim 1, wherein the two halves of the peeling tool form one of a conical and pyramid funnel-shaped passage having a relatively large opening at a first end thereof and a relatively small opening at a second end thereof when the two halves meet each other, and wherein the at least one of the two halves is provided with the protruding bite blade on an inner wall near the relatively small opening of the funnel-shaped passage.

3. The scrapping machine according to claim 2, wherein each of the two halves is supported by each of the clamp arms respectively so that the relatively large opening of the funnel-shaped passage faces downward.

4. The scrapping machine according to claim 2, wherein each of the two halves is supported by each of the clamp arms respectively so that an axis of the funnel-shaped passage is inclined toward the front or rear of the vehicle.

5. The scrapping machine according to claim 1, wherein each of the two halves of the peeling tool is supported by a horizontal pivot shaft mounted on each of the clamp arms so as to be pivotable around the horizontal pivot shaft in a certain limited angle range.

6. The scrapping machine according to claim 1, wherein at least one of the two halves comprises a guide piece for aligning the two halves when the two halves meet each other.

7. The scrapping machine according to claim 1, wherein each of the two halves comprises a plurality of protruding bite blades arranged so that each of the protruding bite blades of one of the halves faces and meshes with an associated protruding bite blade of the other of the two halves when the two halves meet each other.

8. The scrapping machine according to claim 1, further comprising a pair of opposing cups for clamping and holding an object to be scrapped from both sides, wherein each of said cups is supported by each of the clamp arms respectively at a position remoter than that of the peeling tool from the pivot support pins of the clamp arms.

9. The scrapping machine according to claim 1, further comprising a pair of breaking tools for forcibly pressing and crushing or breaking an object to be scrapped from both sides, wherein each of said breaking tools is supported by each of the clamp arms respectively in place of the peeling tool and/or supported by each of the clamp arms respectively at a position remoter than that of the peeling tool from the pivot support pins of the clamp arms.

10. A scrapping machine equipped with a hydraulic-actuated arm and boom assembly which is mounted on an automotive vehicle so as to be vertically tiltable and horizontally swivelable, a power-driven nibbling pincher for scrapping work mounted to a tip of the arm and boom assembly so as to be operable through a remote control, a support block mounted at a front or rear of the vehicle so as to be vertically tiltable, and a pair of right and left power-driven clamp arms supported by the support block respectively with a pair of pivot support pins for a horizontal swing motion, wherein the scrapping machine comprises:

a peeling tool adapted to peel off an outer sheath of a covered electric wire with an associated operation of the power-driven nibbling pincher mounted on the hydraulic-actuated arm and boom assembly, wherein the peeling tool is formed with two halves that oppose each other and that are respectively supported by the clamp arms; and a shear cutter for cutting an object to be scrapped, wherein the cutter is mounted on the pair of clamp arms at a position near to the pivot support pins of the clamp arms and includes a pair of shear blades, a pivot element for pivotably interconnecting the shear blades at their respective first ends on a side toward the support block, and a pair of links for pivotably connecting respective second ends of the shear blades to the respective clamp arms.

11. The scrapping machine according to claim 10, wherein each of the shear blades comprises a single edged blade having a sliding face and a sharpened face opposite to the sliding face, and wherein the shear blades are in sliding engagement with each other on a side of said sliding face.

12. The scrapping machine according to claim 11, wherein each of the shear blades has a concave blade shape in a plane parallel with the sliding face so that tips of the shear blades remote from the pivot element lap over with each other in advance of a concavity thereof in accordance with a closing motion of the pair of clamp arms.

13. The scrapping machine according to claim 10, further comprising a pair of opposing cups for clamping and holding the object to be scrapped from both sides, wherein each of said cups is supported by each of the clamp arms respectively at a position remoter than that of the shear cutter from the pivot support pins of the clamp arms.

14. The scrapping machine according to claim 10, further comprising a pair of breaking tools for forcibly pressing and crushing or breaking the object to be scrapped from both sides, wherein each of said breaking tools is supported by each of the clamp arms respectively at a position remoter than that of the shear cutter from the pivot support pins of the clamp arms.

15. The scrapping machine according to claim 14, further comprising a pair of opposing cups for clamping and holding the object to be scrapped from both the sides, wherein each of said cups is supported by each of the clamp arms respectively at a position remoter than that of the breaking tools from the pivot support pins of the clamp arms.

16. A scrapping machine equipped with a hydraulic-actuated arm and boom assembly which is mounted on an automotive vehicle so as to be vertically tiltable and horizontally swivelable, a power-driven nibbling pincher for scrapping work mounted to a tip of the arm and boom assembly so as to be operable through a remote control, a support block mounted at a front or rear of the vehicle so as to be vertically tiltable, and a pair of right and left power-driven clamp arms supported by the support block respectively with a pair of pivot support pins for a horizontal swing motion, wherein the scrapping machine comprises:

a peeling tool mounted on the clamp arms and adapted to clamp a covered electric wire to be scrapped from a periphery thereof by a closing motion of the clamp arms and to slash and peel off an outer sheath of the clamped covered electric wire in accordance with a drawing operation of a core wire of the clamped covered electric wire with the nibbling pincher mounted on the tip of the hydraulic-actuated arm and boom assembly; and a shear cutter for cutting an object to be scrapped, wherein the cutter is mounted on the pair of clamp arms at a position nearer to the pivot support pins of the clamp arms than a position at which the peeling tool is mounted on the clamp arms, wherein said peeling tool is formed with two halves opposing each other and supported by the clamp arms respectively so that the two halves meet each other and separate from each other through an opening motion and the closing motion of the clamp arms, and wherein at least one of the two halves is provided with at least one protruding bite blade adapted to penetrate at least partially into the outer sheath of the covered electric wire clamped in between when the two halves meet each other, and wherein said shear cutter includes a pair of shear blades, a pivot element for pivotably interconnecting the shear blades at their respective first ends on a side toward the support block, and a pair of links for pivotably connecting respective second ends of the shear blades to the respective clamp arms.

17. The scrapping machine according to claim 16, wherein the two halves of the peeling tool form one of a conical and pyramid funnel-shaped passage having a relatively large opening at a first end thereof and a relatively small opening at a second end thereof when the two halves meet each other, and wherein the at least one of the two halves is provided with the protruding bite blade on an inner wall near the relatively small opening of the funnel-shaped passage.

18. The scrapping machine according to claim 17, wherein each of the two halves is supported by each of the clamp arms respectively so that the relatively large opening of the funnel-shaped passage faces downward.

19. The scrapping machine according to claim 17, wherein each of the two halves is supported by each of the clamp arms respectively so that an axis of the funnel-shaped passage is inclined toward the front or rear of the vehicle.

20. The scrapping machine according to claim 16, wherein each of the two halves of the peeling tool is supported by a horizontal pivot shaft mounted on each of the clamp arms so as to be pivotable around the horizontal pivot shaft in a certain limited angle range.

21. The scrapping machine according to claim 16, wherein at least one of the two halves comprises a guide piece for aligning the two halves when the two halves meet each other.

22. The scrapping machine according to claim 16, wherein each of the two halves comprises a plurality of protruding bite blades arranged so that each of the protruding bite blades of one of the two halves faces and meshes with an associated protruding bite blade of the other of the two halves when the two halves meet each other.

23. The scrapping machine according to claim 16, further comprising a pair of opposing cups for clamping and holding the object to be scrapped from both sides, wherein each of said cups is supported by each of the clamp arms respectively at a position remoter than that of the peeling tool from the pivot support pins of the clamp arms.

24. The scrapping machine according to claim 16, further comprising a pair of breaking tools for forcibly pressing and crushing or breaking the object to be scrapped from both sides, wherein each of said breaking tools is supported by each of the clamp arms respectively in place of the peeling tool and/or supported by each of the clamp arms respectively at a position remoter than that of the peeling tool from the pivot support pins of the clamp arms.

* * * * *